E. A. DERUNGS.
SYSTEM OF HAULAGE.
APPLICATION FILED NOV. 14, 1919.
1,360,902.
Patented Nov. 30, 1920.
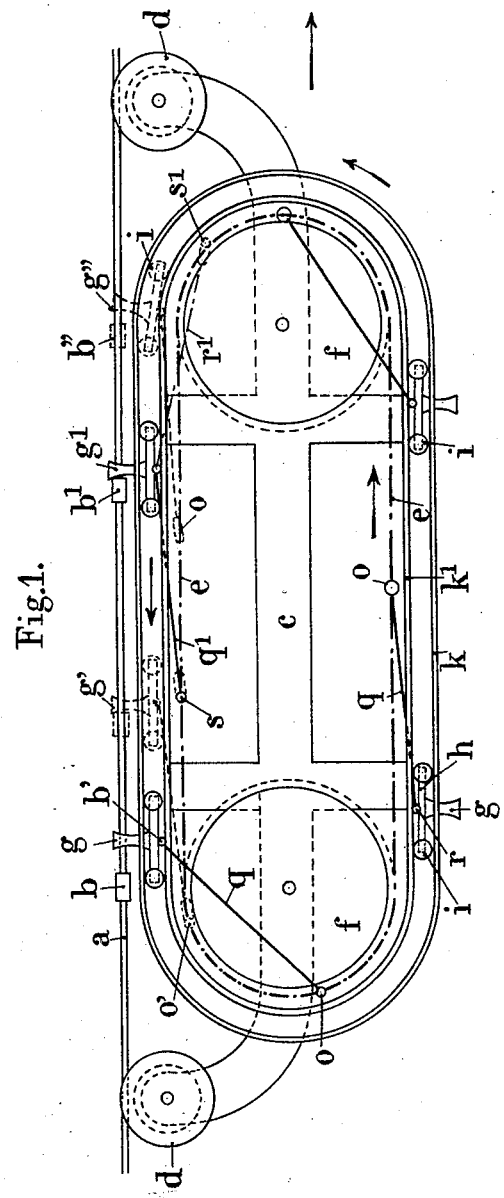
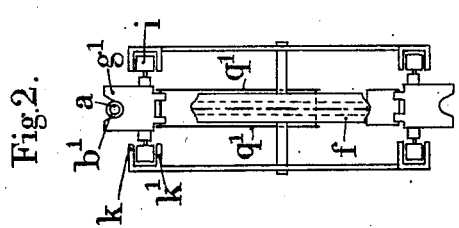

UNITED STATES PATENT OFFICE.

ERNEST ALPHONSE DERUNGS, OF PARIS, FRANCE, ASSIGNOR TO SOCIETE ANONYME ATELIERS OTIS-PIFRE, OF PARIS, FRANCE.

SYSTEM OF HAULAGE.

1,360,902.   Specification of Letters Patent.   Patented Nov. 30, 1920.

Application filed November 14, 1919. Serial No. 337,951.

*To all whom it may concern:*

Be it known that I, ERNEST ALPHONSE DERUNGS, a citizen of France, a resident of 161 Rue de Courcelles, Paris, France, engineer, have invented an Improved System of Haulage, of which the following is a clear, full, and exact description.

In the system of haulage forming the subject-matter of the United States patent application filed on July 25th, 1919, Serial No. 313,398, the displacement of the tractor is produced, in the forms of execution described, by means of clips carried by an endless chain which successively takes a bearing on equidistant stops carried by a fixed cable, these clips being connected to the endless chain by members allowing the said clips to rock in order not to be engaged by the stops of the cable, but holding them at equidistant distances from each other.

In order to allow the working of this system, the interval between two consecutive clips must be slightly greater than the distance separating two stops of the cable. It results therefrom that a slight shock is produced when a clip leaves the cable and that the following clip comes in engagement with the following stop.

If, through use, the chain lengthens, these shocks between the clips and stops may become more violent and prevent the proper working of the system.

The object of this invention is to remedy this inconvenience and consists in rendering the movement continuous by means of a device so constituted that a clip can not leave the cable before the following clip has come in contact with its stop, this contact taking place smoothly and progressively whatever may be the degree of wear and tear of the working stock.

In the form of execution preferably adopted the clips are connected to the endless chain by rods or links which, according as they are located in the straight portions of the chain or in those which pass around the draft pulleys, take variable inclinations and modify the relative positions of two successive clips, so as to obtain a continuous action, without shocks, of these clips on the fixed cable.

The accompanying drawing illustrates, by way of example, a form of execution of this arrangement.

In this drawing:

Figure 1 is a diagrammatic view in elevation,

Fig. 2 is a corresponding side view.

As shown in the drawing, the clips or coupling members $g$ which must come in engagement with the stops $b$ of the fixed cable $a$, are connected to the endless chain $e$ passing on the draft pulleys $f$ by connecting rods or links $q$. Each clip is provided with a pair of these rods or links, as illustrated in Fig. 2.

The clips are guided by rollers $i$ running between rails $k$ $k^1$, which suitably set the clips during their action and during the time they are moved out of the way, as in the arrangement described in the above mentioned application for patent.

The position of a clip relatively to a given point of the chain depends from the setting of the rods or links of this clip. For instance, when the clip $g$ occupies the position $g'$, indicated in dotted lines, its distance relatively to the point $o'$ of the chain, is approximately equal to the length of the rods or links $q$. On the contrary, when this clip arrives in the position indicated in full lines, the length of chain comprised between the point $o$ and this clip is greater than the length of the rod $q$. When passing from $g'$ to $g$ the clip moves therefore slightly backward relatively to the chain. This movement has for effect to move the clip $g$ away from the stop $b$, after the clip $g'$ has come in contact with the following stop $b^1$.

In the position $g'$ $g''$ indicated in dotted lines, these two clips are located on a straight portion of the chain, their connecting rods are parallel and the spacing apart of these two clips is at its maximum.

The maximum spacing apart of the clips is slightly greater than that of two consecutive stops, so that, in this position, $g'$ being in contact with $b'$, $g''$ does not touch $b''$.

The chain being actuated in the direction indicated by the arrows, the connecting rod $q$ inclines, the distance between the two clips $g$ $g^1$ diminishes and at a certain moment the clip $g^1$ comes in contact with the corresponding stop $b^1$.

Then the connecting rod $q$ continuing to take a greater degree of inclination, the clip $g$ is completely released and can move away from the stop $b$.

As will be seen, there is always a clip in contact with a stop and the substitution of a clip for another for causing the actuation takes place without shock as the relative speed of the two clips is very small.

The position shown in full lines of the clip $g$ and of the stop $b$ is that where the distance between $g$ and $g^1$ is the minimum and the play between $b$ and $g$ is the maximum.

The new device may operate in both directions. It is simply necessary to provide each clip with two pairs of connecting rods or links, such as $q^1$ $r^1$ symmetrically arranged, each pair operating in one direction of running. It is necessary, in this case, to provide the ends of the connecting rods secured to the chain with a slide $s$ $s^1$ having a length equal to the maximum retardation of a clip, or with any equivalent device and allowing the connecting rods which do not work to move backward on the chain at the same time as the clip under consideration.

The length of the connecting rods relatively to the diameter of the pulleys $f$ may vary according to the lengthening which is allowed for the endless chain $e$ before it is replaced.

Numerous modifications might be adopted in carrying out the invention. For instance, the chain may be doubled, so that its upper portion comes to the level of the cable to the right and to the left of the latter; this arrangement has the advantage of doing away with the rocking stress exerted on the clips. In this case, the guide rails may be done away with by suspending the clips on the chains by means of any device whatever insuring the movement of translation necessary for the retardation of a clip.

The connecting rods may be rigid, flexible or resilient.

Finally, the various modifications set forth in the specification of the above mentioned patent application may be applied to the new arrangement forming the subject-matter of the present invention.

The above described arrangements are given only by way of example; the forms, dimensions and detail devices may be varied according to circumstances without departing thereby from the nature of the invention.

Claims—

1. In a system of haulage, a fixed cable carrying equidistant stops, a tractor, an endless chain carried by this tractor, coupling members carried by the said chain, means for varying the distance separating two consecutive coupling members.

2. In a system of haulage, a fixed cable carrying equidistant stops, a tractor, an endless chain carried by this tractor, coupling members carried by the said chain, means for causing the coupling members to incline in order to cause the same to escape from the stops.

3. In a system of haulage, a fixed cable carrying equidistant stops, a tractor, an endless chain carried by this tractor, coupling members carried by the said chain, means for varying the distance separating two consecutive coupling members, means for causing the coupling members to incline in order to cause the same to escape from the stops.

4. In a system of haulage, a fixed cable carrying equidistant stops, a tractor, an endless chain carried by this tractor, clips carried by the said chain, means for varying the distance separating two consecutive clips.

5. In a system of haulage, a fixed cable carrying equidistant stops, a tractor, an endless chain carried by this tractor, clips carried by the said chain, means for causing the clips to incline in order to cause the same to escape from the stops.

6. In a system of haulage, a fixed cable carrying equidistant stops, a tractor, an endless chain carried by this tractor, clips carried by the said chain, means for varying the distance separating two consecutive clips, means for causing the clips to incline in order to cause the same to escape from the stops.

7. In a system of haulage, a fixed cable carrying equidistant stops, a tractor, an endless chain carried by this tractor, coupling members carried by the said chain, links connecting the coupling members to the chain.

8. In a system of haulage, a fixed cable carrying equidistant stops, a tractor, an endless chain carried by this tractor, coupling members carried by the said chain, means for varying the distance separating two consecutive coupling members, means for guiding the coupling members.

9. In a system of haulage, a fixed cable carrying equidistant stops, a tractor, an endless chain carried by this tractor, coupling members carried by the said chain, means for causing the coupling members to incline in order to cause the same to escape from the stops, means for guiding the coupling members.

10. In a system of haulage, a fixed cable carrying equidistant stops, a tractor, an endless chain carried by this tractor, coupling members carried by the said chain, means for varying the distance separating two consecutive coupling members, means for causing the coupling members to incline in order to cause the same to escape from the stops, means for guiding the coupling members.

11. In a system of haulage, a fixed cable carrying equidistant stops, a tractor, an endless chain carried by this tractor, clips carried by the said chain, means for varying the distance separating two consecutive clips, rails for guiding the clips.

12. In a system of haulage, a fixed cable carrying equidistant stops, a tractor, an endless chain carried by this tractor, coupling members carried by the said chain, links connecting the coupling members to the chain and attached to the chain by means of slides.

13. In a system of haulage, a fixed cable carrying equidistant stops, a tractor, an endless chain carried by this tractor, clips carried by the said chain, links connecting the clips to the chain and attached to the chain by means of slides.

The foregoing specification of my improved system of haulage, signed by me this 18th day of October, 1919.

ERNEST ALPHONSE DERUNGS.